Dec. 9, 1930.　　　P. M. GELATT　　　1,784,052

VAPOR PRESSURE GAUGE

Filed Jan. 26, 1929

Inventor
Philo M. Gelatt
By Attorneys
Nathan & Bowman

Patented Dec. 9, 1930

1,784,052

UNITED STATES PATENT OFFICE

PHILO M. GELATT, OF MIAMI BEACH, FLORIDA

VAPOR-PRESSURE GAUGE

Application filed January 26, 1929. Serial No. 335,238.

This invention relates to an improvement in vapor pressure gauges and particularly to that type of gauge where a Bourdon tube is employed.

The invention has for its general objects to improve the gauge in such a manner as to make the graduations on the scale or dial plate more nearly uniform. A further object of the invention is to simplify the construction of this type of gauge by eliminating the complicated mechanisms employed, entailing, as they do, serious defects, whereby a more accurate instrument is produced.

The ordinary type of gauge consists of a casing in which is mounted the Bourdon tube having one fixed end and one free end. In this improved type of gauge the free end of the tube is connected to the tail-piece by a gear segment which actuates the pointer. Heretofore means have been provided for varying the ratio on the tail-piece as the Bourdon tube deflects, but all of these prior constructions, so far as I am informed, have one or more effective points at which this transition occurs but there is no gradual transition from one ratio to another, hence it has been impossible to employ a dial with substantially uniform spacing throughout the range of movement of the pointer over the dial. A main object of this invention is to arrange the parts of a vapor pressure gauge so that there will be a gradual transition due to a rapidly accelerating action of the coupling devices that connect the Bourdon tube with the pointer, it being understood that with some kinds of vapor the increase of pressure between zero temperature and 10° centigrade is 15 pounds per square inch while between 90° and 100° the increase is as much as 70 pounds per square inch. Consequently, there should be an accelerating action between certain temperatures of the vapor in order to produce a uniform scale marking for the high and low temperatures.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1:
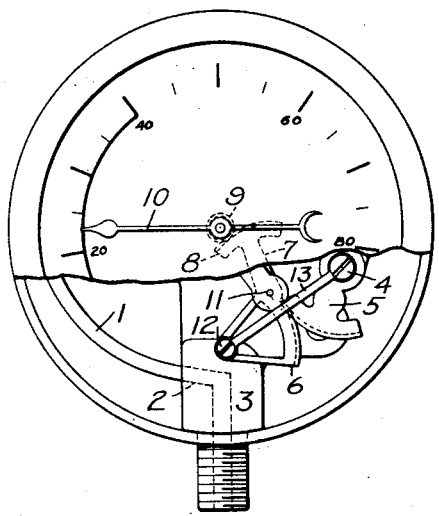
Figure 2:
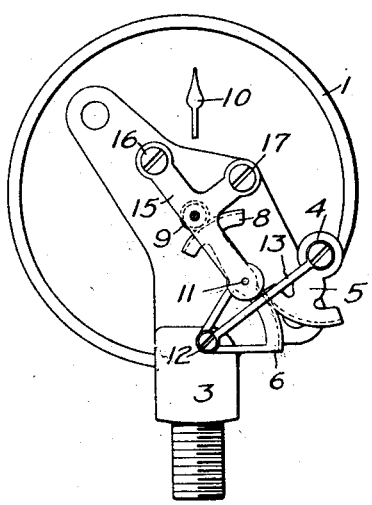
Figure 3:
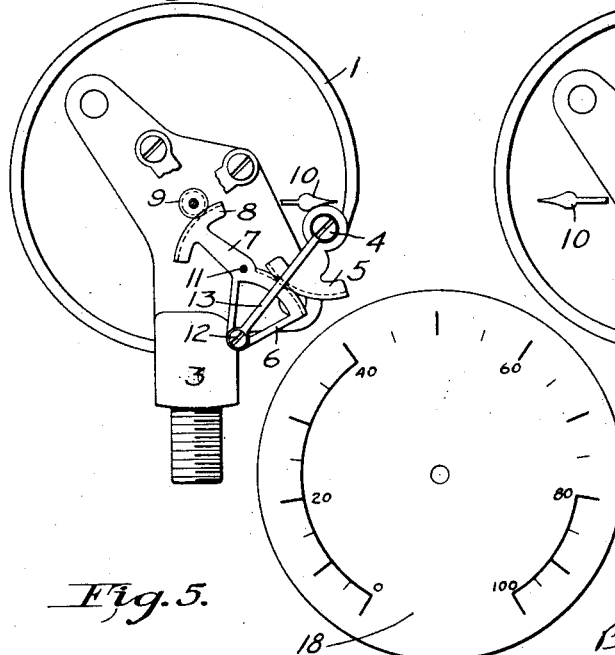
Figure 4:
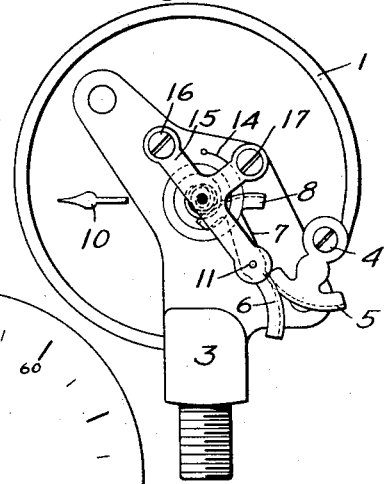
Figure 5:
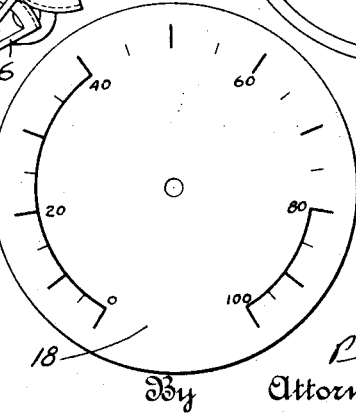

Figure 1 is an elevation with part of the dial broken away to show the position of the parts at the 22° temperature indication. Fig. 2 is a corresponding view of the parts at the 50° indication, the dial being entirely removed. Fig. 3 is a corresponding view, when maximum pressure is exerted. Fig. 4 is a modification, while Fig. 5 is a detail view of the dial.

The Bourdon tube is marked 1 and is shown secured at its fixed end 2 to the casting 3 and at its free end 4 has a sector shaped member 5 pivotally mounted thereon. The periphery of this member 5 is formed with gear teeth which mesh with the gear teeth formed on the tail-piece 6, which is part of the crank arm 7, which has a sector shaped upper member 8 formed with gear teeth engaging with the pinion 9 to which the pointer 10 is connected. This crank arm 7 is pivotally mounted at 11.

The tail-piece 6 is preferably of skeleton form and carries a pivot 12 at one end and on this pivot is mounted a link 13 which is pivotally connected at its other end to the free end 4 of the Bourdon tube. In this manner the sector member 5 is maintained in mesh with the tail-piece 6 during the movement of the Bourdon tube. A satisfactory result is also obtained by substituting a coiled spring for link 13. In the modification shown in Fig. 4 the spring 14 is substituted for the link 13, one end of this coil spring being secured to the casting 3 and the other end to the upper end of crank arm 7. There is preferably shown a bracket 15 which carries the bearings for the pointer and the crank arm, this bracket being secured to the casting 3 at the points 16 and 17.

The dial plate 18 (Fig. 5) is graduated from zero to 100° centigrade and as shown thereon the graduations are substantially uniform throughout. This uniformity in the dial graduations is made possible by the rolling engagement of the sector 5 with the tail-piece 6 causing a gradually accelerating movement of the pointer inversely proportionate to the movement of the end of the Bourdon tube as the latter deflects under pressure, the theory being that as the tube deflects under pressure, the gear attached to the end of the tube rolls outward on the toothed tail-piece 6, and by so doing decreases the ratio of movement of the tube and pointer. As will be readily seen by comparing Figs. 1 and 3 the point of contact of gears on sector 5 and sector 6, as it rolls outwardly, moves away from the center 11 on which the sector 7 oscillates, hence it is apparent that the leverages are changed, and the amount of movement transmitted by an increment of deflection of the tube to the pinion 9 and its pointer will be much reduced when the point of contact of the gears reaches the position shown in Fig. 3 as compared with the amount of movement transmitted by the same increment of deflection in the position shown in Fig. 1. The pointer travel may be made to function more uniformly by substituting a rack and elliptical gear combination for the gear segments 6 and 5 shown in the drawings, and maintaining the two units in contact by means of a tension spring 14 as shown in Fig. 4.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of United States:—

1. In an instrument of the character specified, characterized as having a Bourdon tube and rotatable pointer controlled by the vapor pressure of said tube, the combination of an intermediate member with gear teeth thereon, pivotally mounted on the free end of said tube; an additional pivoted gear in mesh with the gear teeth of said member; and connecting means between said additional gear and said pointer, the contacting point of the intermeshing gear rolling outwardly from the pivot of said additional gear whenever said tube is deflected outwardly, thereby automatically changing the leverage of the members intermediate said tube and pointer.

2. In an instrument of the character specified the combination of an expansible member subject to vapor pressure with a rotatable pointer controlled by said vapor pressure, intermeshing gears, one being mounted on and carried by the free end of said expansible member and the other connected with said pointer, and means for holding said gears in mesh, both gears being pivotally mounted and movable relatively to said tube upon the deflection of said tube whereby upon its deflection the contacting point of said gears will move automatically to different positions.

3. In an instrument of the character specified the combination of an expansible member subject to vapor pressure with a rotatable pointer controlled by said vapor pressure, intermeshing gears, one being pivotally mounted on the free end of said expansible member and the other pivotally connected with said pointer, and a connecting bar pivotally connected to said gears for holding said gears in mesh and permitting the point of contact of said gears to move outwardly from the pivot of said other gear during the outward movement of the free end of said expansible member.

4. A pressure gauge combining a Bourdon tube; a rotatable pointer; a lever fulcrumed intermediate its ends, one end of said lever having a gear connection with said pointer for rotating the latter and the other end of said lever having an arcuate portion; a member pivotally mounted upon the free end of said Bourdon tube and having an arcuate portion in rolling engagement with the arcuate portion of said lever; and means to maintain said arcuate portions in rolling contact during deflection of said Bourdon tube.

5. A pressure gauge combining a Bourdon tube; a rotatable pointer; a lever of the first order formed with first and second gear segments at opposite sides of its fulcrum; a pinion connected with said pointer and engaging said first gear segment; a member pivoted upon the free end of said Bourdon tube and having a segmental gear portion engaging the second gear segment; and a link connecting the free end of said Bourdon tube with said lever and serving to maintain said second gear segment and said segmental portion in rolling contact during deflection of said Bourdon tube.

6. A pressure gauge combining a support; a pointer pivoted thereon; a Bourdon tube having one end fixed to said support; a lever fulcrumed intermediate its ends to said support and having, at its opposite ends, first and second gear segments; a pinion connected with said pointer and engaging said first gear segment; a member pivoted upon the free end of said Bourdon tube and having a segmental gear portion engaging said second gear segment; and a spring tending to rotate said pinion and thereby maintain said second gear segment and said segmental portion in contact during deflection of said Bourdon tube.

In witness whereof, I have hereunto subscribed my name.

PHILO M. GELATT.